Aug. 4, 1931.  J. R. ARMSTRONG ET AL  1,816,995
COMBINED PRESSURE RECORDING AND VOLUME REGISTERING
ATTACHMENT FOR FLUID METERS
Filed Dec. 31, 1925

INVENTORS
J. R. Armstrong
L. H. Duncan
BY
W. G. Doolick
ATTORNEY

Patented Aug. 4, 1931

1,816,995

UNITED STATES PATENT OFFICE

JAMES R. ARMSTRONG, OF CRAFTON, AND LEVI H. DUNCAN, OF BEN AVON, PENNSYLVANIA, ASSIGNORS TO PITTSBURGH EQUITABLE METER COMPANY, OF PITTSBURGH, PENNSYLVANIA, A CORPORATION OF PENNSYLVANIA

COMBINED PRESSURE RECORDING AND VOLUME REGISTERING ATTACHMENT FOR FLUID METERS

Application filed December 31, 1925. Serial No. 78,545.

This invention relates to a fluid measuring apparatus, and particularly to means for measuring the volume and pressure of gas.

In our co-pending application, Serial No. 732,458, filed August 16, 1924, we have disclosed an attachment for fluid meters for recording the volume and pressure of gas, and have disclosed therein as one form of our invention, an arrangement wherein a chart is caused to revolve by means of a clock. Associated with the chart in such manner as to make a record thereon, is a pen which responds to the pressure of the gas passing through the meter. Associated with this mechanism is a meter index of the usual type, by which gas passed through the meter is registered. A second pen is provided and there is an operating connection between this pen and the index. This connection is such that the pen is moved in a sinuous path on the margin of the chart. In the arrangement shown in said application, this second pen is operated by one of the index shafts of the meter index. If it is operated by the thousand-foot shaft, each wave or cycle which it produces on the chart represents the passage of a thousand cubic feet through the meter. Since the pressure gauge is operating at the same time, the pressure at which each thousand feet passes through the meter may thus be recorded. As the clock which drives the chart operates at a constant speed, the amount of gas flowing each hour or each day, or for any given period of time, and the pressure at which it flowed through the meter, may be readily determined from the chart.

According to the present invention, it is proposed to provide a somewhat similar arrangement, whereby a pen is caused to oscillate by means of the meter index, while the chart is revolved at a constant speed.

It is an object of the present invention to provide an improved operating connection between the index and the pen by means of which the construction of the unit is simplified.

It is a further object to provide a construction whereby this oscillating pen may be operated from one of a plurality of the meter index shafts, whereby the device may be arranged to operate most conveniently for the volume and pressure of gas passing through the meter. In other words, it is proposed by the present invention to provide means whereby the pen may be operated either from the thousand-foot shaft, for example, or from the ten-thousand-foot shaft of the index. If the meter is in a circuit wherein there is a heavy flow of fluid, it is desirable that the pen be operated from the ten-thousand-foot shaft, in order that the spacing between cycles of the record will be relatively large, so that it will be comparatively easy to reduce the reading of the record to the actual volume of gas passing through the meter in terms of a fixed pressure. If, on the other hand, the meter is in a line where the flow of gas is relatively light, it is desirable that the oscillating pen be arranged to complete its cycle more frequently, and therefore, it may be operated from the one-thousand-foot shaft. In like manner, the pen could be arranged to operate from any other shaft of the meter index.

The invention may be readily understood by reference to the accompanying drawings, which illustrate the preferred embodiment of the invention, but to the details of which the invention is not confined.

Figure 2:
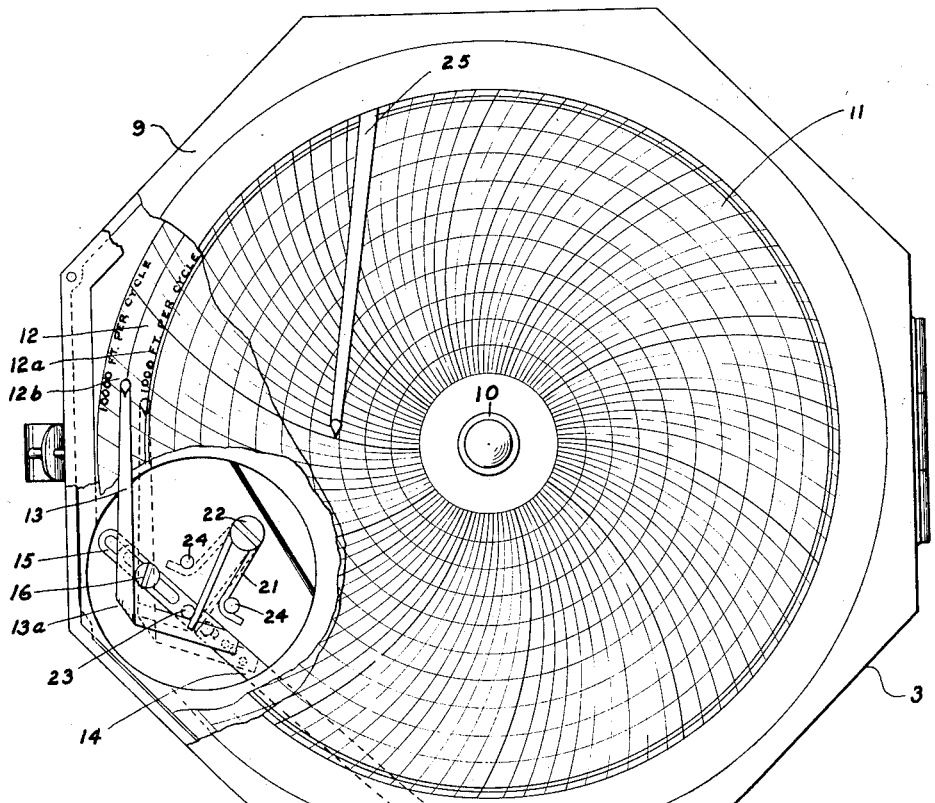
Fig. 2 is a detail view showing a modified form of actuating cam for the connection between the meter index and the recording pen.
Figure 2:
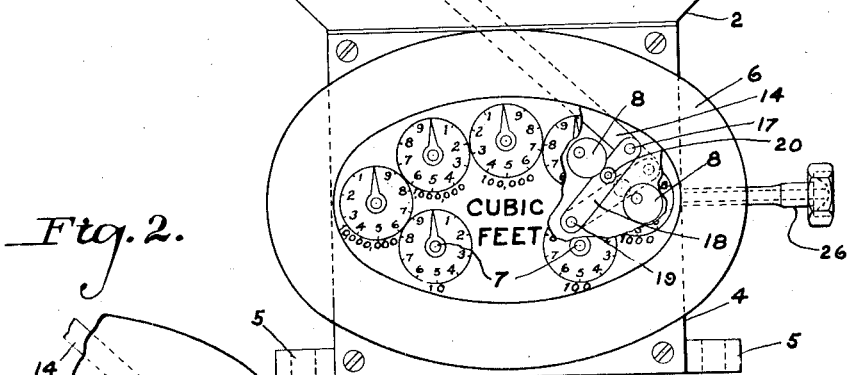

Referring to the drawings, 2 designates a casing having an upper portion 3, which is preferably octagonal, and a lower portion 4, on which are feet 5. The feet 5 are so arranged that they may be set on and secured to the top of a standard gas meter. In the lower portion 4 of the housing is a meter index of the usual type, having a plurality of indicators, which are operated from indicator shafts, designated 7. On some of the shafts, preferably two, there are eccentrics 8. We have shown these eccentrics as being on the thousand-foot and ten-thousand-foot indicator shafts, but they could be placed on any desired shafts.

On the upper part 3 of the housing is a door 9. Within the housing is a record gauge mechanism including a central hub 10, through which a chart 11 is revolved. The chart 11 preferably has a marginal portion 12 which is divided to provide inner and outer spaces 12a and 12b, respectively. Operatively associated with the chart is a recording stylus 13, which is carried on a link or connecting bar 14. The stylus 13 has a bent portion 13a intermediate its ends, so that the bar 14 may be located back of the chart or chart plate, while the stylus itself will operate over the chart. The bar 14 extends diagonally of the device, and has a slotted upper end portion 15, which is guided on a pin 16. The lower end of the bar 14 is pivotally connected at 17 to a lever 18, pivoted in the meter index frame at 19. The lever 18 carries a small roller 20 intermediate its ends. By swinging the lever from the full line to the dotted line position, the roller 20 may be shifted out of operative engagement with one cam 8 into operative engagement with the other cam 8.

Mounted in the gauge housing near the upper end of the bar 14 is a reversible spring 21 carried on a pin 22. One end of this spring bears against a pin 23 on the bar 14, while the other end of the spring bears against one of two fixed pins 24 in the housing. When the spring is in the position shown in full lines in Fig. 1 of the drawings, it bears against the pin 23 to urge the bar 14 upwardly to thereby hold the roller 20 on lever 18 against the cam 8 of the ten-thousand-foot indicator shaft. If the spring is reversed to the dotted line position of Fig. 1, it will serve to urge the bar 14 in the opposite direction, and thereby hold the roller 20 in operative engagement with the cam 8 on the one-thousand-foot indicator shaft.

Figure 1:
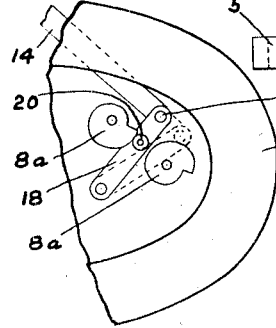
Fig. 1 represents an elevational view of a unit embodying the present invention, part of the construction being broken away in order to more clearly disclose the invention.

If the device is to be used in a line where there is a heavy flow of fluid, the parts are set in the position shown in full lines in Fig. 1 of the drawing. As thus arranged, the cam 8 in conjunction with the spring 21 will serve to impart a reciprocable movement to the bar 14. The bar 14, in reciprocating, will cause the stylus 13 to reciprocate across the space 12b in the margin of the chart. The chart is arranged to be continuously revolved at a constant speed by a clock, as ordinarily provided in recording pressure gauges. This will result in the forming of a continuous sinuous marking in the marginal portion 12b of the chart. Every cycle in this marking will represent ten thousand feet of gas passed through the meter, inasmuch as a cycle will be completed upon each complete rotation of the cam 8 of the ten-thousand-foot indicator shaft.

In view of the foregoing, it will be seen that if the meter were handling a relatively heavy flow of gas and the stylus were so arranged that it would operate upon every rotation of the thousand-foot indicator shaft, that the cycles in the marking produced by the stylus would be so close together as to render an accurate reading of the chart difficult. When the stylus is operating from the ten-thousand-foot indicator shaft, the cycles are much more open, so that the reading of the chart is comparatively easy. However, if the meter is in a line where the flow of gas is relatively small, it would be undesirable to have the stylus operate from the ten-thousand-foot indicator shaft, for the reason that the cycles of movement would be so infrequent that it would be difficult to accurately read the chart. Consequently, the parts can be shifted according to the present invention, so as to move them into the position shown in dotted lines in Fig. 1. The stylus would then be operated through a complete cycle upon each complete rotation of the cam 8 of the one-thousand-foot indicator shaft. In this event, the stylus moves across the marginal space designated 12a. By the provision of different marginal spacings for operation of the stylus with different indicator shafts, the same chart may be used in meters passing either large or small quantities of gas. It is not necessary that different forms of charts be used when the parts are shifted from one position to the other, and those persons whose duty it is to calculate the flow of gas from the charts, can easily determine whether they shall calculate ten thousand feet to the cycle or one thousand feet to the cycle.

In order to give a complete record of the quantity of gas passing through the meter, a second stylus 25 is provided which is actuated by a suitable pressure responsive device, not shown. This stylus will record on the chart simultaneously with the stylus 13, and will indicate the static pressure for each cycle of volume. At 26 is shown a connection by means of which the gauge may be connected into a line, so as to respond to the static pressure.

It will thus be seen that the present invention provides a novel and simple way of recording simultaneously on a single chart the volume and pressure of a fluid passing through a meter and permits of the use of such a device in connection with the usual meter index.

The invention also provides a device which is readily adaptable for use in lines handling either heavy or light flows of fluid. Furthermore, the entire structure is self-contained and is encased in a single housing. It can be mounted as a unit on the top of the standard meter. Being entirely encased in a single casing, it can be easily set up and protected in a gas field or in any other exposed place.

In the modification shown in Fig. 2, we have illustrated the form of cam which we prefer to use on the indicator shafts in place of the circular eccentric cams shown in Fig. 1. These cams 8a are of such shape that the stylus will be moved rapidly in one direction, thereby producing a somewhat sharp or ratchet-toothed marking on the chart instead of a purely sinuous line. This marking can be read more easily than the purely sinuous line.

It will be understood that while we have shown the cams 8 and 8a as being provided on the one-thousand and ten-thousand-foot indicator shafts, that they could be provided on any desired shafts in a meter index.

We claim as our invention:

1. A fluid measuring device including a meter index having a plurality of index shafts, a chart associated therewith, a recording stylus operatively associated with the chart, eccentrics on at least two of said index shafts, and an operating connection for the stylus selectively movable into operative engagement with either of the eccentrics.

2. A fluid measuring device including a meter index having a plurality of index shafts thereon, some of said shafts having eccentrics thereon, a chart, a stylus operatively associated with the chart, and an operating means for the stylus including an arm arranged between certain of said eccentrics and selectively movable into operable relation with any one of the plurality of eccentrics.

3. A fluid measuring device including a meter index, a rotatable chart, a stylus operatively associated with the chart, a plurality of stylus operating elements in the meter index, an operating connection connected with the stylus and selectively movable into engagement with any one of the stylus operating elements of the index, and a reversible spring for holding said connection in engagement with said elements.

4. A fluid measuring device including a meter index, a chart, a stylus operatively associated with the chart, a reciprocable rod for operating the stylus, said meter index having at least two shafts therein on which are eccentric cams, a lever associated with the index pivotally connected with said rod, cam engaging means on the lever, and a reversible spring for resiliently urging said cam engaging means into contact with one or the other of said cams.

5. A metering index having a plurality of index shafts, a chart associated therewith, a recording stylus operatively associated with said chart and means including an arm positioned between said index shafts and arranged to selectively engage stylus operating means on either shaft whereby said recording stylus may be operatively controlled by one or another of said index shafts.

6. A measuring device, having a plurality of index shafts, each carrying a stylus operating cam, a chart, a stylus associated with said chart, and a connector arranged to be shifted into engagement with one or another of said cams to be controlled thereby, said connector being arranged to control said stylus.

7. In combination, a metering device, a plurality of index shafts on said metering device, a chart associated therewith, a recording stylus operatively associated with said chart, a plurality of cam members on said index shafts, a lever in operative engagement with one of said cam members for operation thereby, said lever operating said stylus and means for shifting said lever into engagement with another of said cam members.

8. In combination, a meter comprising a plurality of index shafts mounted for rotation at different angular velocities, a stylus, a member arranged to be operated by one of said index shafts for operating said stylus in accordance with the operation of said shaft, and means for shifting said member from engagement with said index shaft to an engagement with another of said index shafts.

9. In combination, a metering device comprising a plurality of index shafts mounted for rotation at different angular velocities, a chart, a recorder stylus associated with said chart and means for controlling said stylus in accordance with the operation of an index shaft, arranged to be shifted into engagement with one or another of said index shafts.

10. In combination, a meter comprising a plurality of index shafts mounted for rotation at different angular velocities, a recorder including a stylus and operating means interconnecting said stylus with either of said index shafts, said operating means and stylus being shiftable from a position in which they are controlled by the rotation of one of said index shafts to a position at which they are controlled by the other of said index shafts.

11. In combination, a meter comprising a plurality of index shafts, a stylus, a pivoted arm arranged between said index shafts, a shiftable lever connecting the free end of said arm to said stylus, means on each of said index shafts for moving said arm and a reversible spring for selectively biasing said arm against one or the other of said arm moving means.

12. A fluid measuring device including a meter index, a chart, a stylus operatively associated with the chart, a rod for operating the stylus, said meter index having at least two shafts therein on which are cams, a lever associated with the index pivotally connected with said rod, cam engaging means on the lever, a reversible spring co-operating with the bar for resiliently urging said cam engaging means into contact with one or the other of said cams and means on said chart to indicate the normal operative position of the stylus when in association with either index shaft.

In testimony whereof we affix our signatures.

JAMES R. ARMSTRONG.
LEVI H. DUNCAN.